(12) United States Patent
Cragg

(10) Patent No.: US 11,484,803 B2
(45) Date of Patent: *Nov. 1, 2022

(54) MOBILE DC POWERED ENTERTAINMENT CENTER

(71) Applicant: Brandon Cragg, Lauderdale by the Sea, FL (US)

(72) Inventor: Brandon Cragg, Lauderdale by the Sea, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 17/243,062

(22) Filed: Apr. 28, 2021

(65) Prior Publication Data

US 2021/0245064 A1  Aug. 12, 2021

Related U.S. Application Data

(63) Continuation-in-part of application No. 17/006,699, filed on Aug. 28, 2020, now abandoned, which is a continuation of application No. 16/114,951, filed on Aug. 28, 2018, now Pat. No. 10,758,829.

(60) Provisional application No. 62/551,009, filed on Aug. 28, 2017.

(51) Int. Cl.
*A63F 13/90* (2014.01)
*A63F 13/98* (2014.01)
*A45C 11/00* (2006.01)

(52) U.S. Cl.
CPC .............. *A63F 13/90* (2014.09); *A63F 13/98* (2014.09); *A45C 2011/003* (2013.01)

(58) Field of Classification Search
CPC ..... A63F 13/90; A63F 13/98; A45C 2011/003
See application file for complete search history.

(56) References Cited

U.S. PATENT DOCUMENTS

| 4,666,042 A * | 5/1987 | Dlott | A63F 9/001 446/73 |
|---|---|---|---|
| 5,260,884 A * | 11/1993 | Stern | G06F 1/1628 361/679.55 |
| 10,758,829 B2 * | 9/2020 | Cragg | A47B 31/00 |
| 2004/0016673 A1 * | 1/2004 | Kovich | A45C 11/20 206/542 |
| 2005/0170889 A1 * | 8/2005 | Lum | H04W 84/22 463/39 |
| 2008/0029153 A1 * | 2/2008 | Margalit | H02J 7/0047 320/101 |

(Continued)

*Primary Examiner* — Jasson H Yoo
(74) *Attorney, Agent, or Firm* — Malloy & Malloy, P.L.; Robert M. Downey

(57) ABSTRACT

A mobile entertainment center includes at least one TV monitor supported in a protective case on wheels. The case includes a removable cover that protectively conceals the TV monitor when not in use. When removed, the cover functions as a table or TV stand and includes removable or hinged legs. The TV monitor includes a non-reflective glass over the screen. The entertainment system is syncable with other portable electronic devices and includes speakers/sound bars. The entertainment center is DC powered and includes a voltage convertor. The mobile entertainment center further includes a charging station, flashlight, storage compartment, watertight casing, swipe screen technology, a control panel with access door, built in battery access, a rechargeable DC power source for each electronic device, a DC powered built-in gaming platform, and interactive karaoke technology.

10 Claims, 21 Drawing Sheets

(56) References Cited

U.S. PATENT DOCUMENTS

| | | | | |
|---|---|---|---|---|
| 2011/0092294 A1* | 4/2011 | Mercier | ................ | A63F 13/90 |
| | | | | 463/46 |
| 2013/0026726 A1* | 1/2013 | Thomas | ............... | A45C 13/385 |
| | | | | 280/43.1 |
| 2015/0101958 A1* | 4/2015 | Cross | .................... | A45C 11/38 |
| | | | | 206/703 |

* cited by examiner

MOBILE DC POWERED ENTERTAINMENT CENTER

This non-provisional patent application is a Continuation-In-Part of non-provisional patent application Ser. No. 17/006,699 filed Aug. 28, 2020, which is a Continuation of non-provisional patent application Ser. No. 16/114,951 filed Aug. 28, 2018, now U.S. Pat. No. 10,758,829 issued Sep. 1, 2020, which is based on provisional patent application Ser. No. 62/551,009 filed Aug. 28, 2017.

BACKGROUND OF THE INVENTION

Field of the Invention

The present invention relates to a mobile entertainment center and, more particularly, to an apparatus that includes at least one full size LCD flat screen television monitor, speakers, and an onboard rechargeable DC power source all carried in a protected case supported on wheels, and wherein the protective case converts into a tabletop for supporting the TV monitor and speakers.

Discussion of the Related Art

The operation of a full sized TV monitor, such as a LCD flat screen TV of 20 inches or larger in size, typically requires connection to an AC power source. Moreover, other components that may be used in conjunction with the TV monitor, such as a video game console, added speakers, and other electronic devices typically require connection to an AC power source as well. However, there are instances where it is desirous to be able to use a larger flat screen TV monitor at locations where there is no access to an AC power source. For example, beaches, parks, campgrounds and other outdoor venues typically do not have convenient access to an AC power source where a flat screen television monitor, speakers and other components can be plugged in for supplying power to operate the TV monitor and other components. Moreover, it can be difficult to transport a larger size flat screen TV monitor along with speakers and other electronic components to an outdoor venue, such as a beach or park.

Accordingly, there remains a need for a mobile DC powered entertainment center that includes at least one larger size (i.e., 20 inches or greater in size) flat screen TV monitor that is supported within a protective case on wheels, and wherein the entertainment center further includes one or more speakers, a rechargeable DC power source, as well as a built-in video gaming platform and other components, such as interactive karaoke technology.

There is a further need for a mobile DC powered entertainment center that includes a built-in DC power converter (i.e., converts 12 volts to 19 volts) and which is able to synchronize with a portable mobile device, such as a smart phone, as well as a drone (i.e., drone camera).

SUMMARY OF THE INVENTION

The present invention is directed to mobile entertainment center that includes at least one larger size LCD flat screen TV monitor supported in a protective case on wheels. The protective case includes a removable cover that protectively conceals the TV monitor when not in use. When removed, the cover functions as a table or TV stand and includes legs (i.e., either removable or hinged to the bottom of the cover). The TV monitor includes a non-reflective glass over the screen. The entertainment system is syncable with other portable electronic devices and includes speakers and sound bars. The mobile entertainment center is DC powered and includes a rechargeable DC power source, along with a voltage converter. The mobile entertainment center further includes a charging station, at least one flashlight, storage compartments, swipe screen technology, a control panel with access door, built-in battery access, a DC powered built-in gaming platform, and interactive karaoke technology. The following are features of the mobile DC powered entertainment center:

- Non Reflective Glass on the screen
- Solar and Wind Powered/Along with Stationary Bike Charger/Hand Crank Charger
- Convertor not Invertor
- Double Screens (screens that face both directions) Multiple Screens
- Wheels on Protective Carrying Case/doubles as TV Stand
- Handle On Television
- Syncable with other portable units
- Speakers/Sound Bars
- Socket in bottom of case for collapsible stand (like for speakers)
- Charging Station
- Flashlight
- Storage Compartment
- Water Tight Casing
- Each electronic device on the Mobile Entertainment Center will have its own rechargeable DC power source with the larger DC power source with more capacity being removable. (e.g.: speakers, television)
- DC Power built in gaming platform complete with joy sticks. (e.g. XBOX)
- Interactive Karaoke Technology (comparison would be to interactive trivia in a bar)
- Swipe Screen Technology on device
- Control panel access door. (so you can access volume button, on/off switch etc.)
- Built in battery access through side of case. (explanation: for changing batteries out of the device you simply push on battery and the battery pops out)
- Built in convertor (converts 12 volts into 19 volts or whatever volt the device requires)
- App will be written so remote control will control device through phone. Also be able to link to multiple devices on unit. As well as multiple other devices when present. (explanation: With present technology your phone can only control one device at a time)
- Device will be able to connect directly to drone. (explanation: whatever the drone camera sees will show up on screen of device)

BRIEF DESCRIPTION OF THE DRAWINGS

For a fuller understanding of the nature of the present invention, reference should be made to the following detailed description taken in conjunction with the accompanying drawings in which.

Like reference numerals refer to like parts throughout the several views of the drawings.

DETAILED DESCRIPTION OF THE PREFERRED EMBODIMENTS

Figure 1:
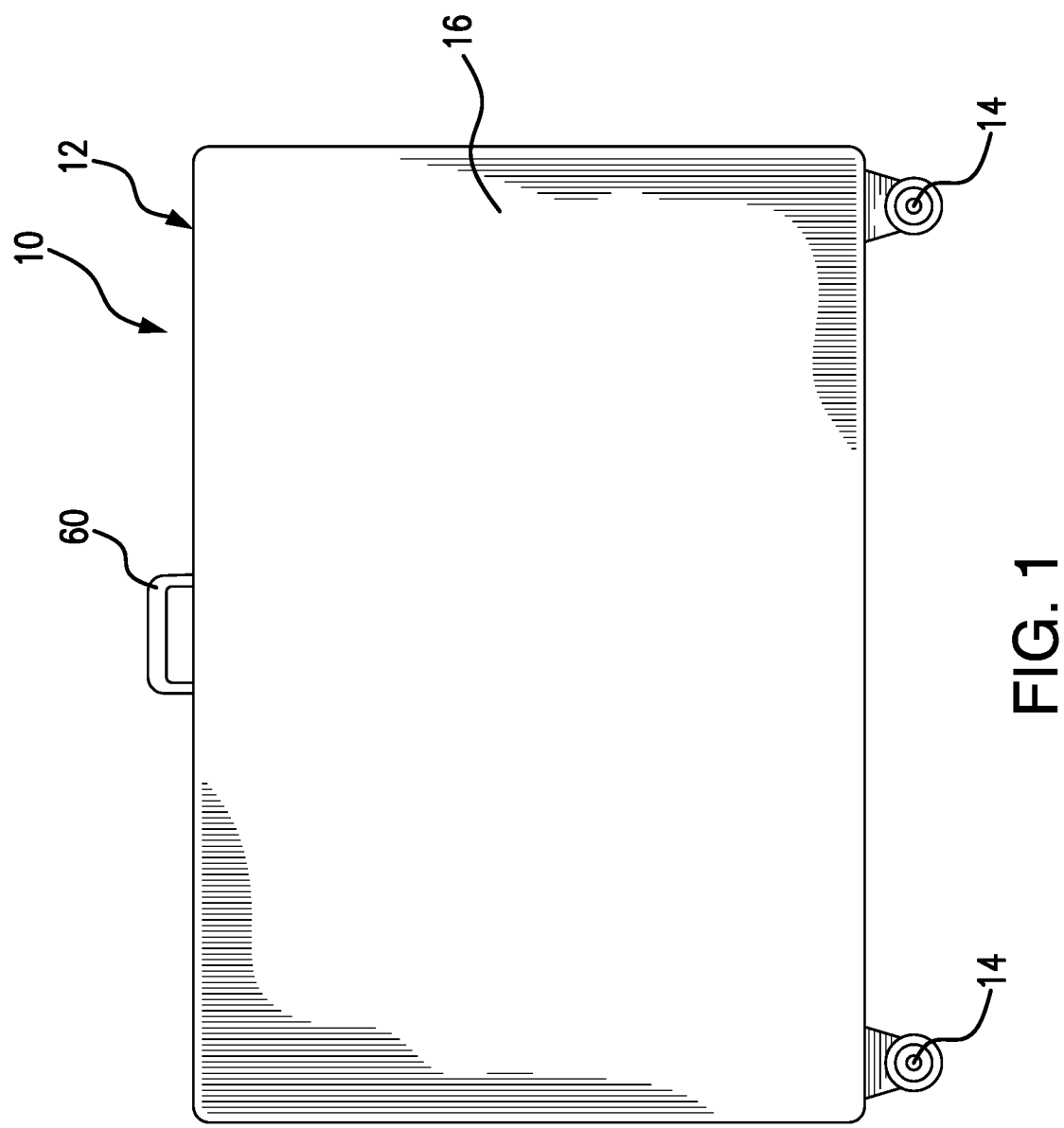
FIG. 1 is a front elevational view of the mobile DC powered entertainment center of the present invention, shown with a removable protective cover placed over a TV monitor for transport.
Figure 2:
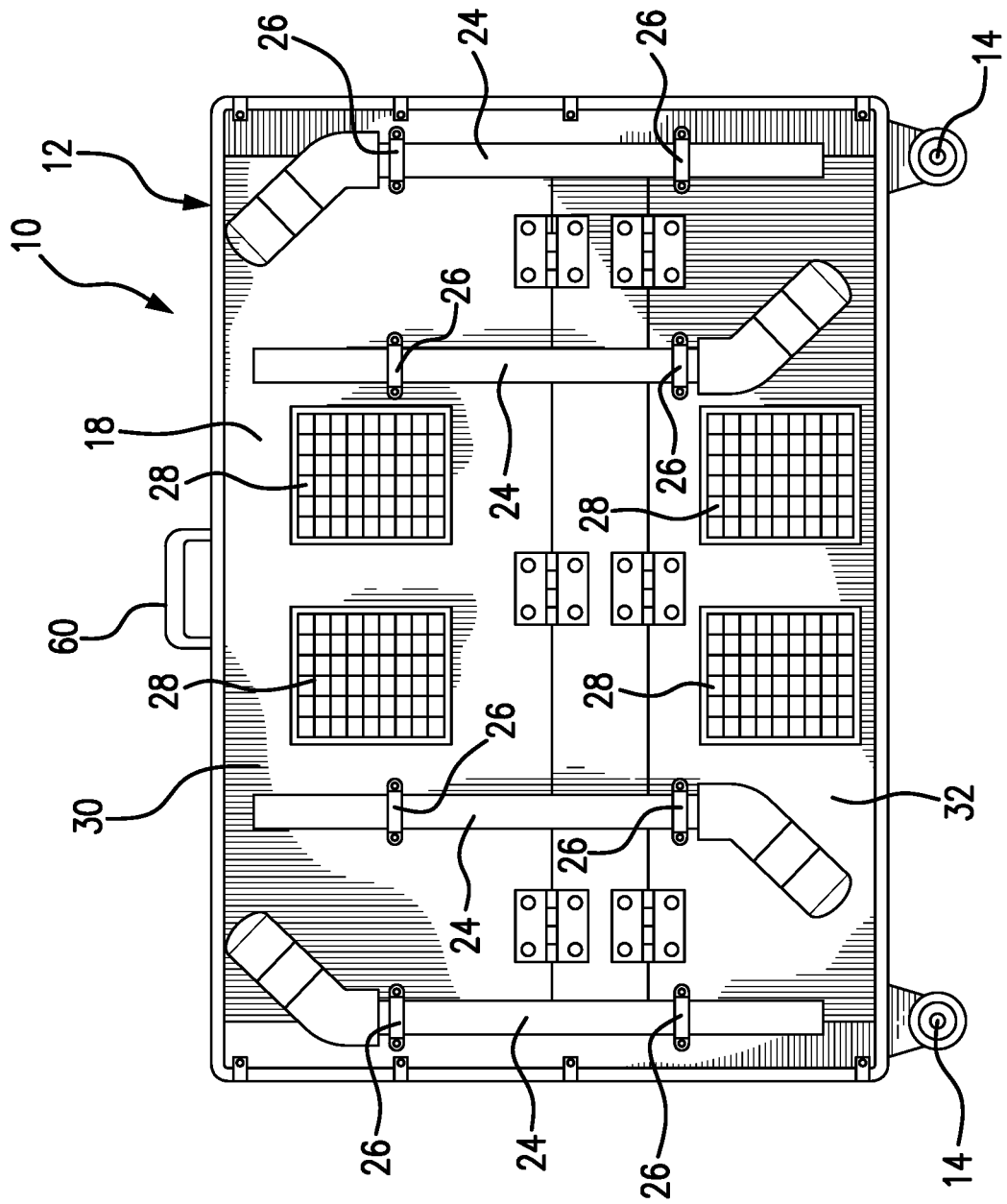
FIG. 2 is a rear elevational view of the mobile DC powered entertainment center shown ready for transport.
Figure 3:
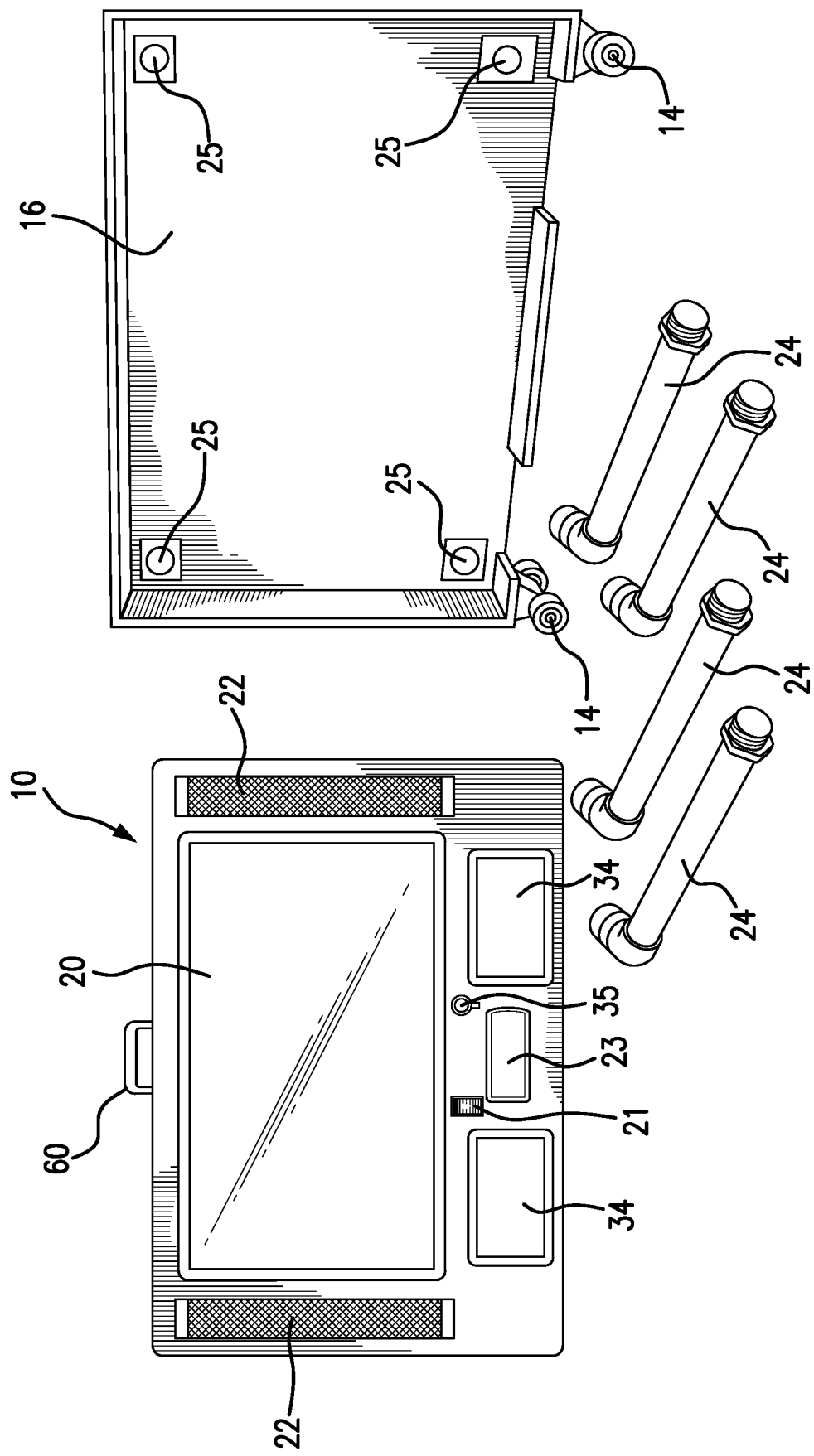
FIG. 3 is an exploded perspective view showing the protective cover of the case of the mobile entertainment center removed to reveal a large size LCD TV monitor, several smaller LCD flat screen displays and speakers on a front panel of the mobile entertainment center, as well as removable legs that attach to an underside of the protective cover to convert the protective cover into a table or TV stand for supporting the larger LCD flat screen TV monitor, speakers and other components.

Referring to the several views of the drawings, and initially FIGS. 1-3, the mobile DC powered entertainment center of the present invention is shown and is generally indicated as 10. The mobile entertainment center 10 includes a protective case 12 having a front panel and a rear panel 18. The protective case 12 is supported on two or more wheels 14 to allow ease of transport of the mobile entertainment center 10 along a floor or ground surface. The protective case 12 further includes a handle 60 to allow for ease of carrying of the mobile entertainment center 10, and particularly lifting of the mobile entertainment center 10 onto a table (see FIG. 4) or other elevated support surface. The protective case further includes a removable cover 16 that is attached to the remainder of the case to protectively cover the entire front panel, including a large LCD flat screen TV monitor 20 during transport of the mobile entertainment center. In a preferred embodiment, the wheels 14 are attached to the cover, as seen in FIG. 3. The cover 16 is removed from a remainder of the protective case 12 to reveal the TV monitor 12, as well as other components such as speakers/sound bars 22, smaller removable flat screen monitors 34, a removable DC charging station with flashlight 23, as well as an on and off switch 21 and a DC power socket 35.

Figure 4:
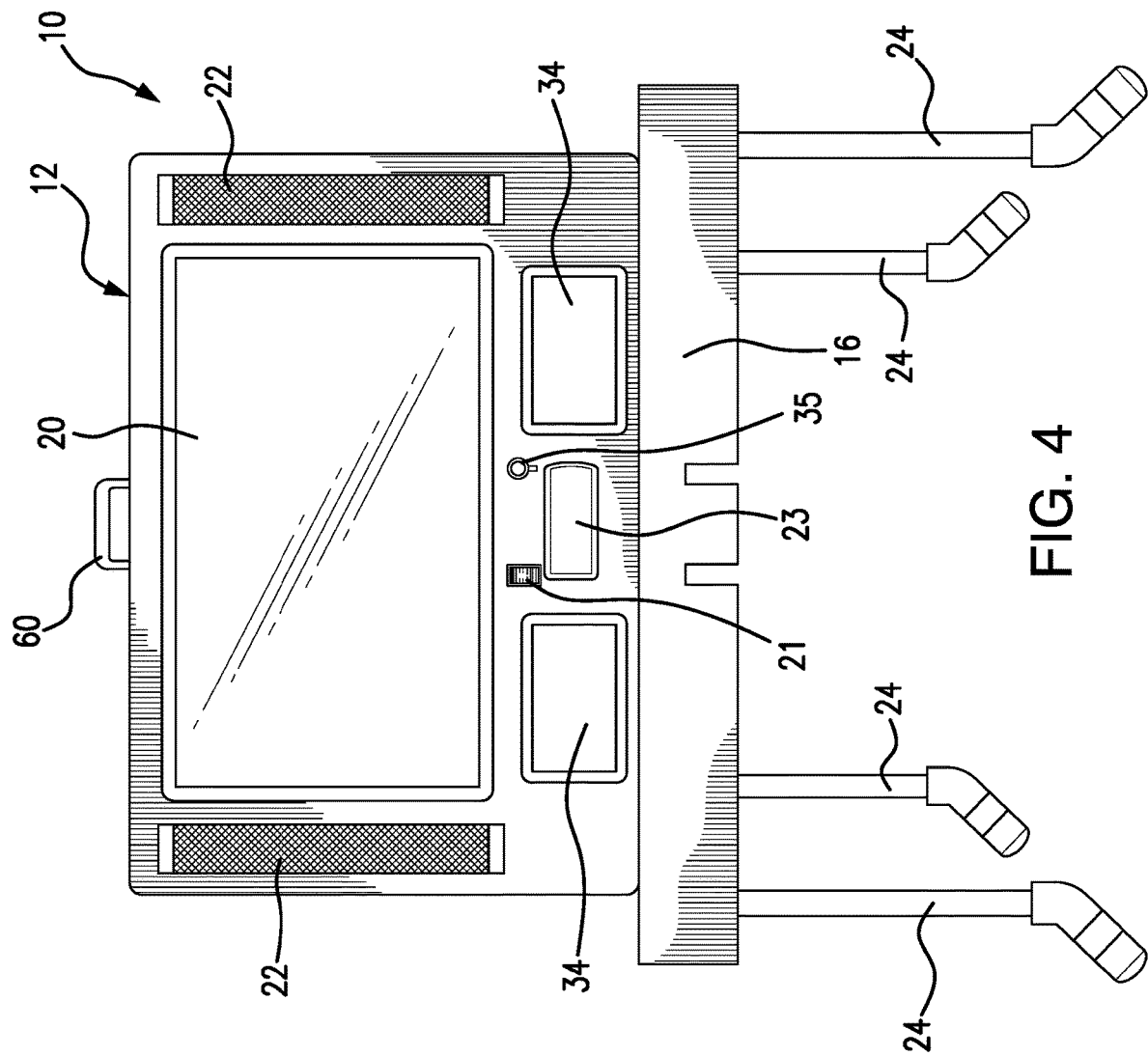
FIG. 4 is a front elevational view showing the entertainment center, including the larger LCD TV monitor, speakers, smaller LCD monitors and other components in the protective case of the entertainment center supported on the table or TV stand that is constructed using the cover of the protective entertainment center case with the legs attached to the underside of the cover.

The back panel 18 of the protective case is provided with an arrangement of clips 26 for holding legs 24 on the back panel during transport. When it is desired to set up the mobile entertainment center for use, at the desired location, the front cover 16 is removed and the legs 24 are removed from the back panel and attached within sockets 25 on an inner side of the protective cover 16 to create a table or TV stand, as seen in FIG. 4. The legs are provided with screw threads for screw threaded attachment within the sockets 25. Alternatively, the legs can be hingedly attached to the inside of the cover 16 and simply folded out and locked into place when it is desired to set up the table.

Figure 6:
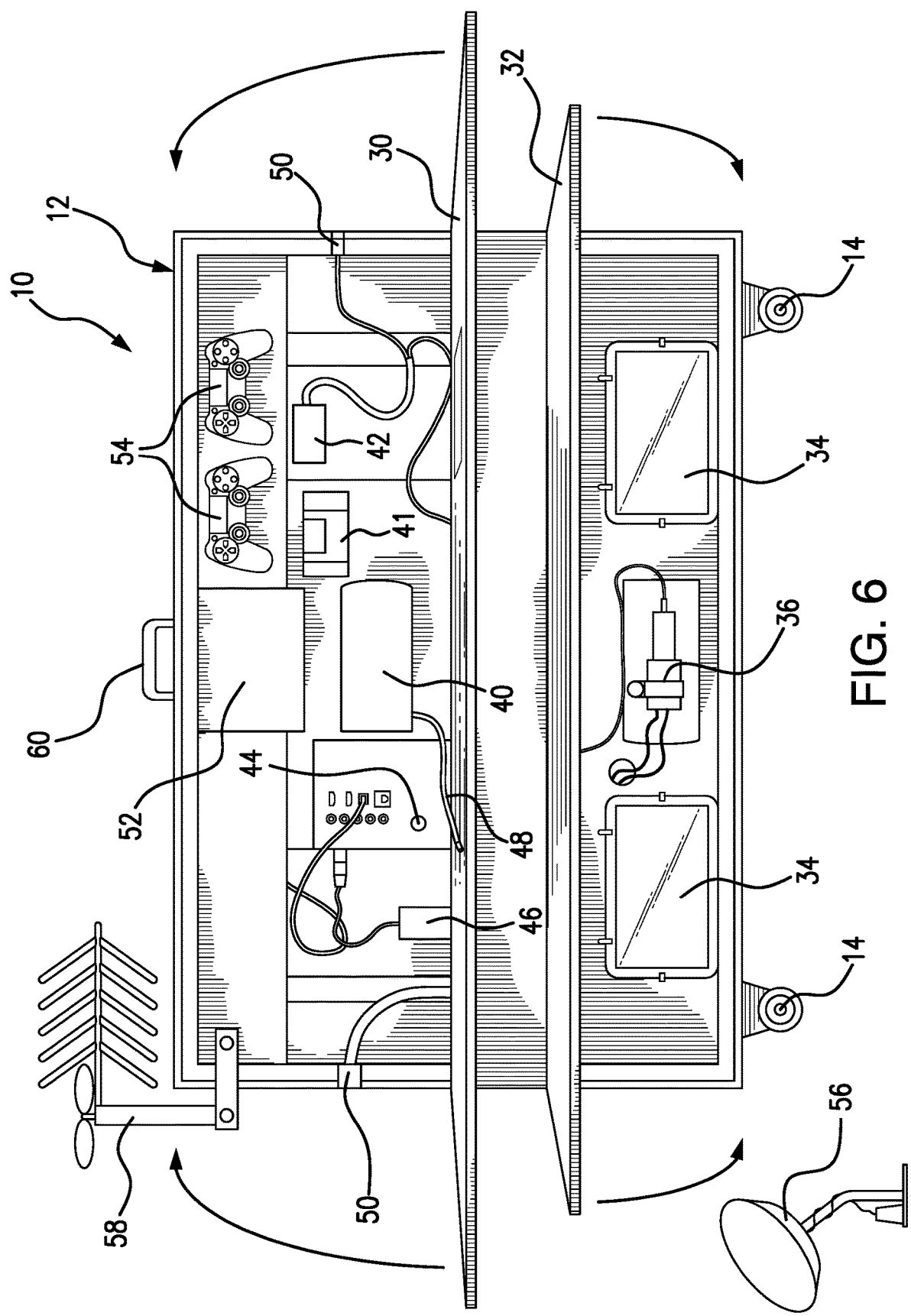
FIG. 6 is a rear perspective view showing upper and lower compartment doors on the backside of the entertainment center open to reveal the several components therein.

The back panel 18 further includes an arrangement of solar panels for recharging one or more DC battery power sources in the entertainment center. In a preferred embodiment, the solar panels have a 12 volt, 60 watt rating. The back panel 18 further includes an upper compartment door 30 that hinges open and down to reveal an upper compartment, and a lower compartment door 32 that hinges upwardly, to reveal a lower compartment, as illustrated in FIG. 6. The upper and lower compartments are within the protective case 12 and house a number of components, as described in more detail below.

Referring to FIG. 6, the lower compartment includes a 12 volt socket assembly 36 that connects to one or more 12 volt DC battery power sources containing the case 12. The 12 volt socket assembly 36 is further connected to the DC power socket 35 on the front panel of the protective case 12. The lower compartment may further house the removable and portable LCD flat screen monitors 34 that can be placed on the front panel, as seen in FIGS. 3 and 4, within or over compartments on the front panel. The compartments (not shown) are behind the removable portable flat screen monitors 34 in FIGS. 3 and 4 and can be used to hold various items such as headphones, remote controls, and personal belongings of the user.

The upper compartment, behind the upper compartment door 30, contains a rechargeable DC power supply 40 that is used to provide power to the several electronic components of the mobile entertainment center 10. The upper component further contains a charge controller 41, a step up power converter (12 to 19 volts) 42, a DC power input 44, a multiport USB hub 46 and connections 50 or auxiliary speakers. The rechargeable DC power supply 40 includes a DC power cord 48 for connection to a DC powered device.

A further feature of the mobile entertainment center 10 of the present invention is an onboard gaming platform for playing video games (e.g., XBOX, PLAYSTATION, NINTENDO). In particular, a DC powered video gaming console 52 is built within the protective vase 12, and is accessible through the upper compartment behind the upper compartment door 30, as seen in FIG. 6. The onboard video gaming platform further includes rechargeable wireless video game controllers 54 that are stowed within the upper component of the protective case 12, behind the upper compartment door 30 when not in use. Naturally, the video games are played by the user on the large flat screen LCD TV monitor 20 with audio provided through the several speakers/sound bars 22, as well as any added auxiliary speakers. The mobile entertainment center 10 may further include interactive karaoke technology.

A miniature satellite dish 56 may be provided for receiving satellite signals, in particularly satellite TV and radio signals for connection to the TV monitor 12 and speakers 22. A collapsible hinged radio/TV antenna 58 can be contained within the upper compartment and deployed, as shown in FIG. 6, for receiving radio and TV signals. The antenna 58 may further be used for communicating with one or more drones, and particularly drones having still frame and video cameras, wherein images captured by the cameras on the drones can be displayed on the TV monitor 12, as well as the portable flat screen monitors 34.

Figure 5:
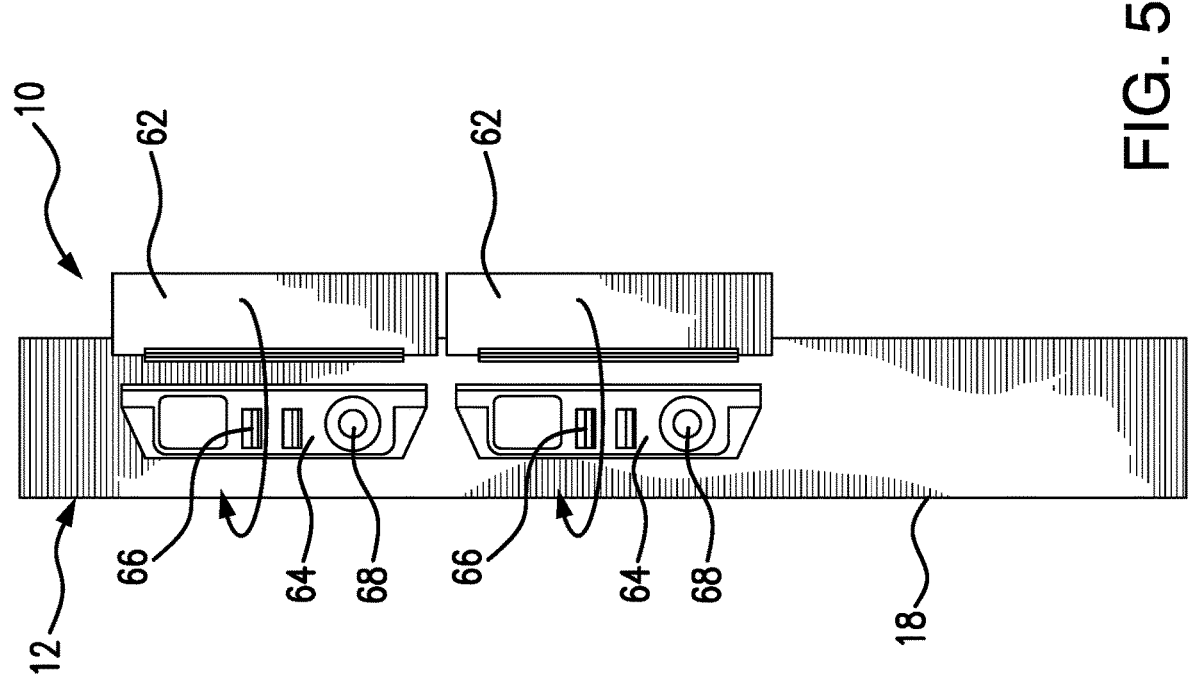
FIG. 5 is a side elevational view showing battery compartments on the side of the entertainment center, with built-in battery access that allow for changing of the batteries by simply pushing in on the battery to release a spring mechanism that pushes the battery out of the case of the entertainment center.

Referring to FIG. 5, a side of the protective case 12 includes hinged, watertight doors 62 that open to reveal rechargeable DC batteries (12 volt/19 volt) 64. The rechargeable DC batteries 64 include 5 volt USB recharging ports 66 as well as a flashlight recharging port 68. The rechargeable DC batteries can be easily removed from the protective case 12 of the mobile entertainment center 10 via a push/release spring loaded mechanism. By simply pushing in on the batteries, a spring release mechanism is activated which pushes the battery out from the side of the case for removal. This allows for ease of recharging and/or replacement of the batteries 64.

Referring now to FIGS. 7 through 13, a further embodiment of the mobile DC powered entertainment center of the present invention is shown and is generally indicated as 110, wherein the mobile DC powered entertainment center is supported on a trailer 112 having a trailer chassis 114, a forward trailer tongue 115 for attachment to a bumper hitch to tow the trailer, and left and right wheels 116 that preferably have inflatable tires, as well as an ornamental bottle cap hubcap. The trailer further includes a forward support 119 with a wheel 118 for supporting the trailer in the position shown in FIGS. 8 and 9 when detached from the towing vehicle.

Figure 7:
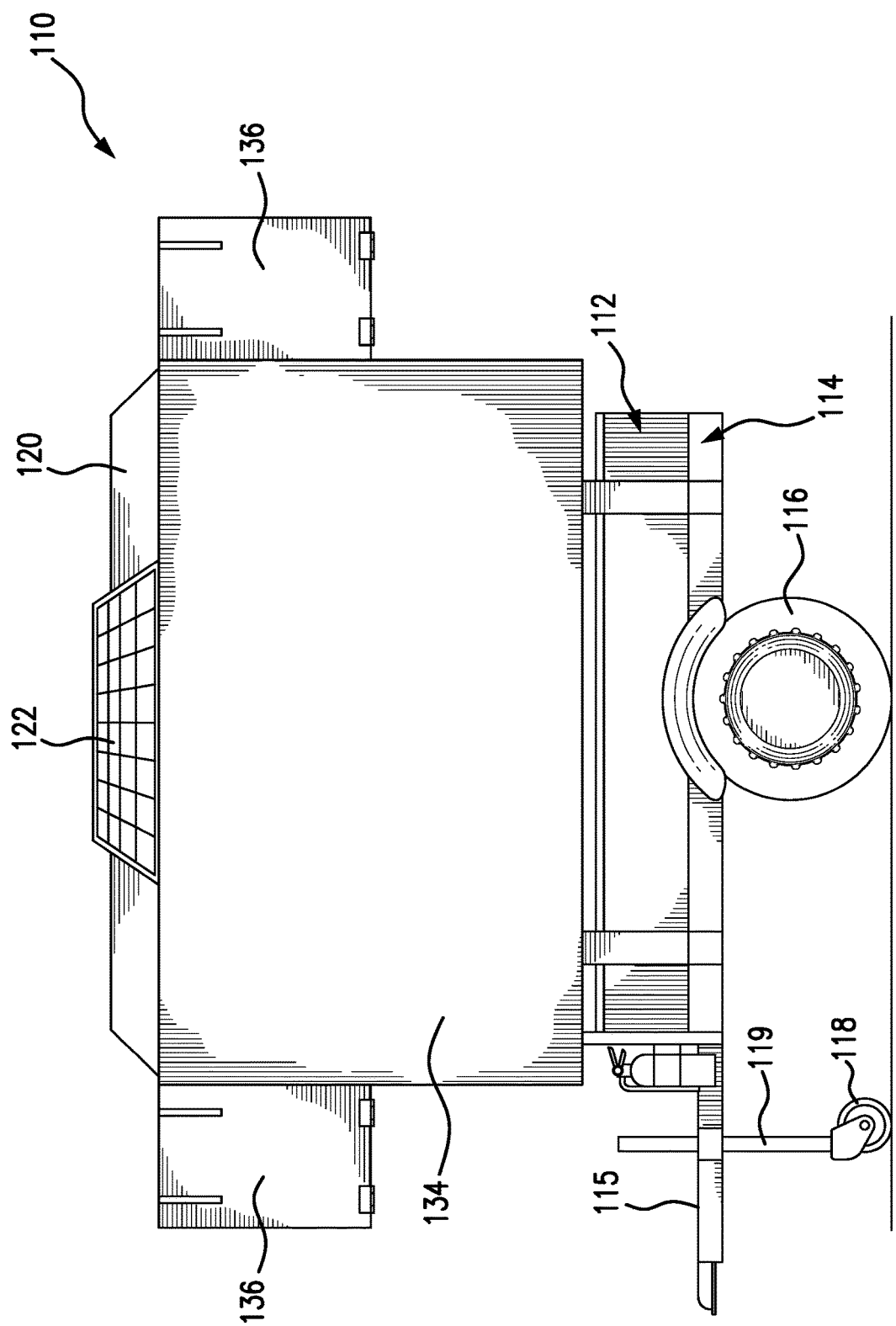
FIG. 7 is a side elevational view of the mobile DC powered entertainment center of the present invention in accordance with a further embodiment, wherein the mobile DC powered entertainment center is supported on a trailer having wheels and which is intended to be towed by a motor vehicle, and further wherein the mobile DC powered entertainment center is shown with a removable protective cover placed over a large TV monitor for transport.
Figure 8:
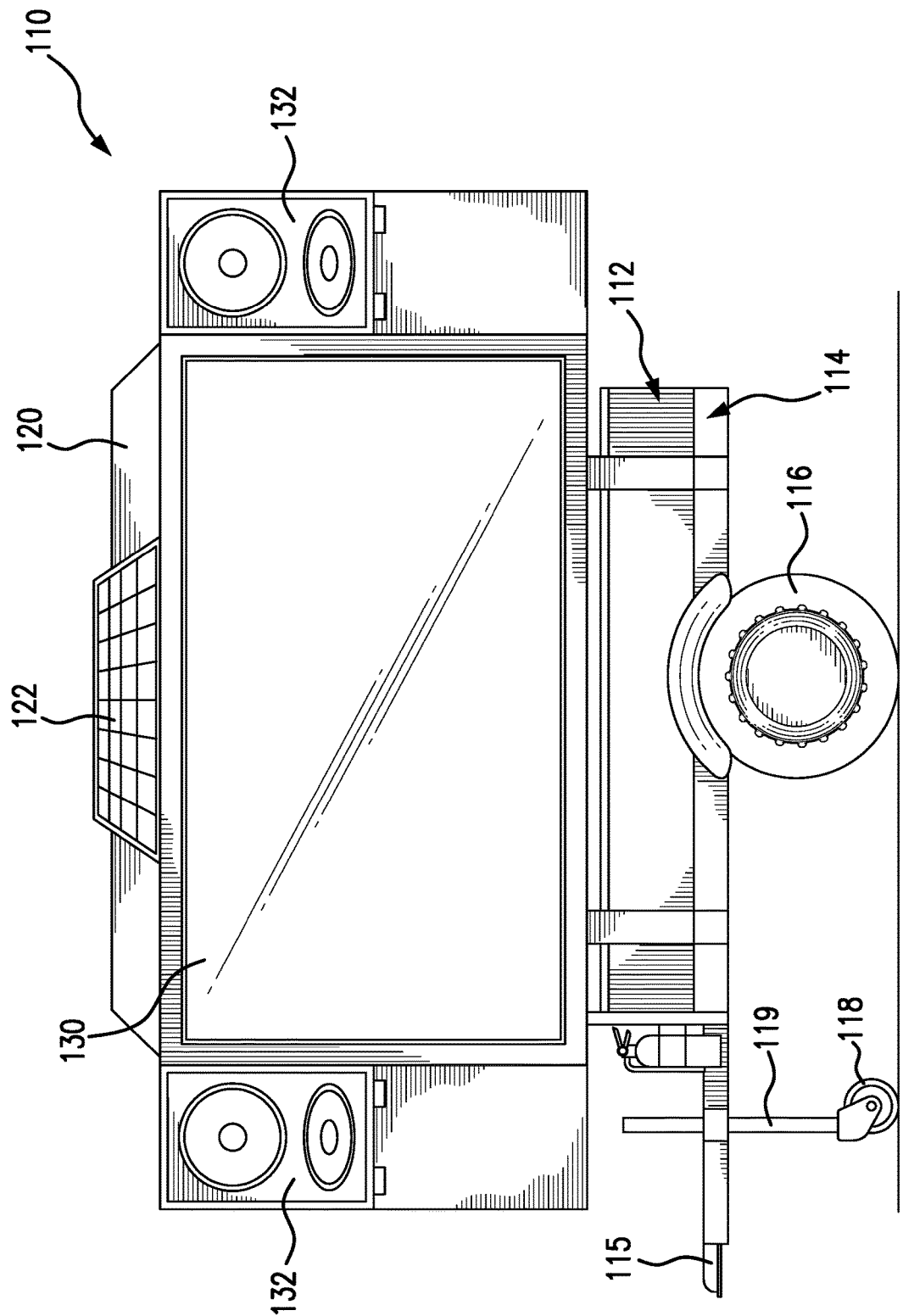
FIG. 8 is a side elevational view of the mobile DC powered entertainment center of FIG. 7 shown with the protective cover removed to reveal a large size LCD TV monitor.
Figure 9:
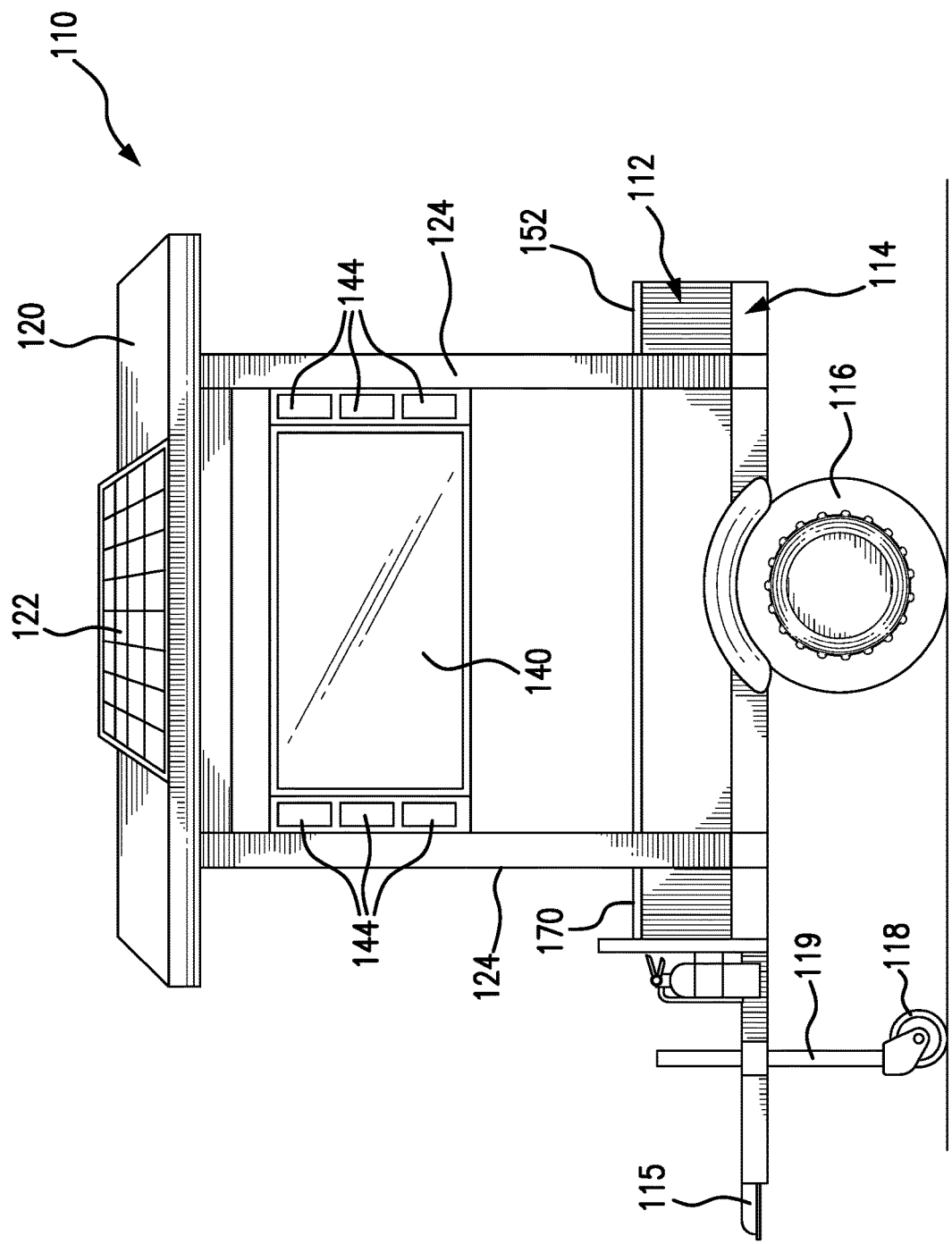
FIG. 9 is a side elevational view of the mobile DC powered entertainment center of FIG. 7 and shown with the large size LCD TV monitor removed to reveal a smaller size LCD TV monitor along with other components.

Referring to FIG. 8, the mobile DC powered entertainment center 110 includes a roof 120 that may be provided with solar panels 122 for charging batteries and other electrical components on the trailer. The roof 120 is supported by a vertical frame structure 124 including an arrangement of vertical posts that extend upwardly from the trailer to the roof. A large TV monitor 130 is supported on at least one side of the vertical structure of the entertainment center between the trailer and the roof. Removable speaker boxes with covers 136 are supported on opposite sides of the large TV monitor 130. In a preferred embodiment, the speaker boxes are removably attached to either the TV monitor or the vertical structure of the mobile DC powered entertainment center. The speaker boxes contain speakers 132 that can play audio corresponding with video being displayed on the large TV 130 or other audio programs as desired by the user. As seen in FIG. 7, a cover 134 is placed over the large TV monitor 130 to protect the TV monitor when not in use and during transport. Similarly, the covers on the speaker boxes 136 are raised and secured to cover the speakers 132 when not in use, particularly during transport.

Figure 10:
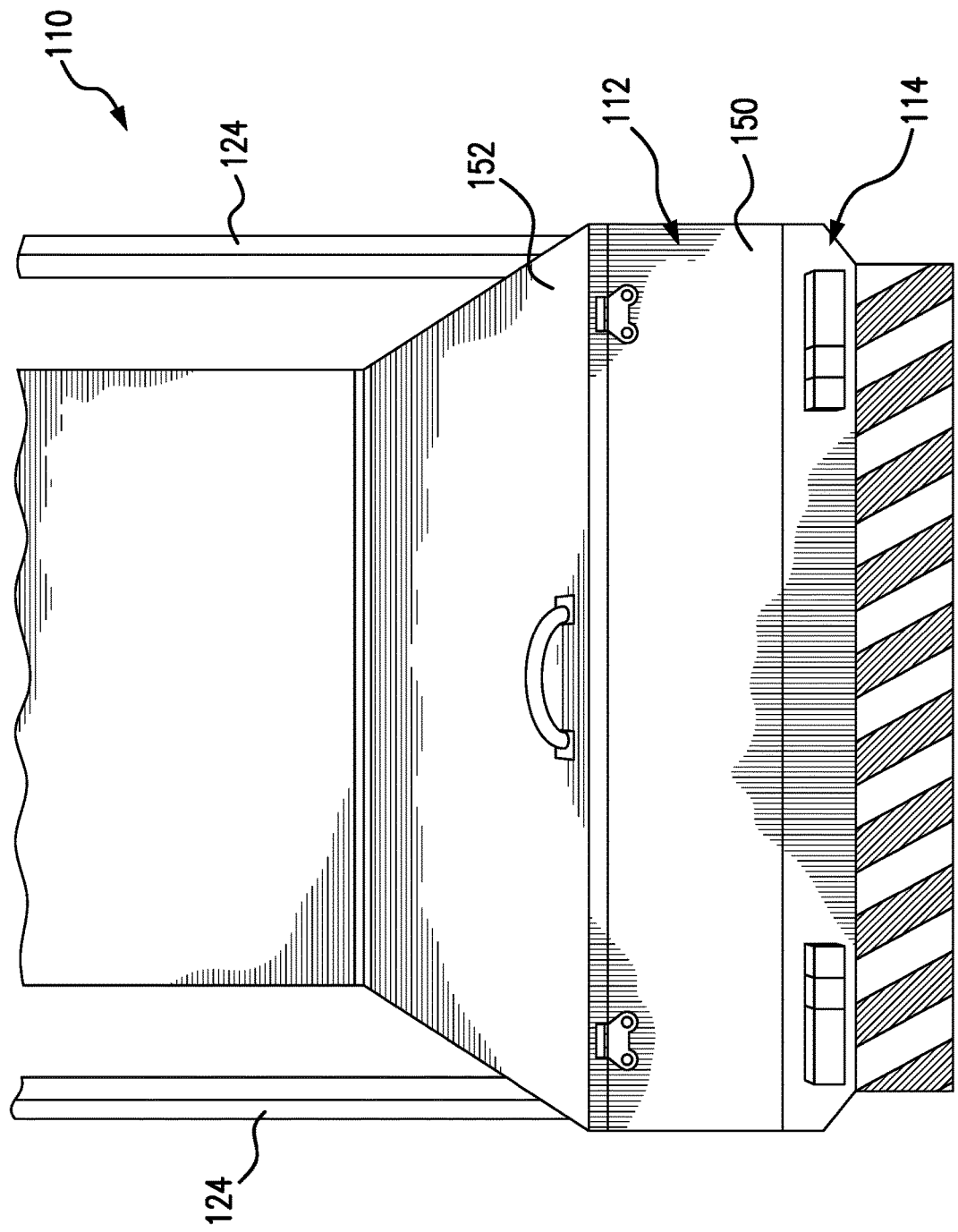
FIG. 10 is a perspective view of a rear end of the trailer.
Figure 11:
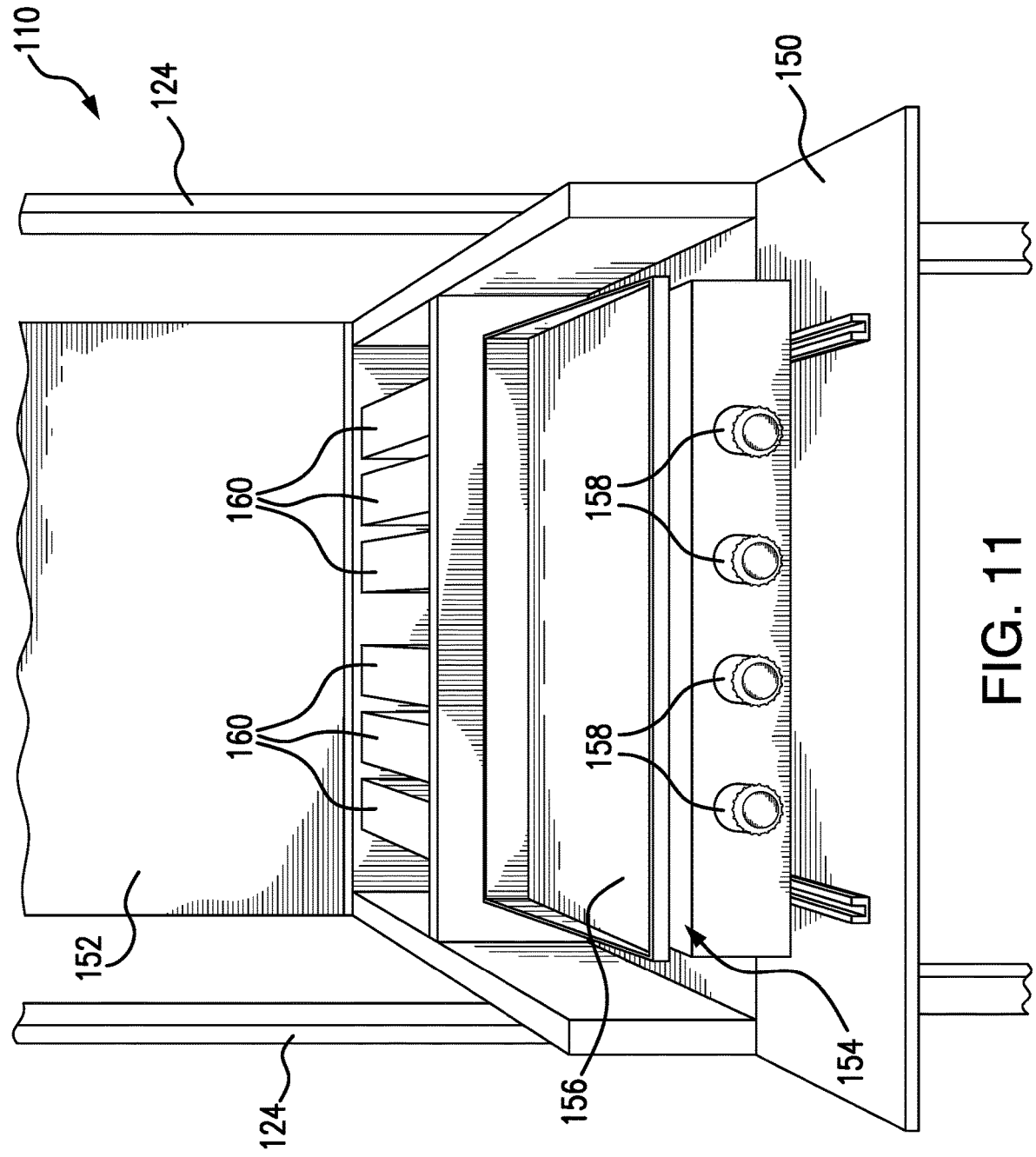
FIG. 11 is a perspective view of the rear end of the trailer with a cover of the mobile DC powered entertainment center opened to reveal a cooking grill and a battery compartment.

Referring to FIGS. 10 and 11, a rear portion of the trailer 114 includes a barbecue grill and battery compartment 150. As seen in FIG. 11, a top cover 152 can be raised to reveal the barbecue grill 156, as well as the battery compartment containing an arrangement of batteries 160. The barbecue grill is supported on tracks and can be rolled out when the tailgate of the compartment is lowered, as seen in FIG. 11. Knobs 158 on the barbecue grill allow for adjusted and controlled heat of the grill surface. The barbecue grill may be either electrically operated or powered by propane contained in tanks on the trailer.

Figure 12:
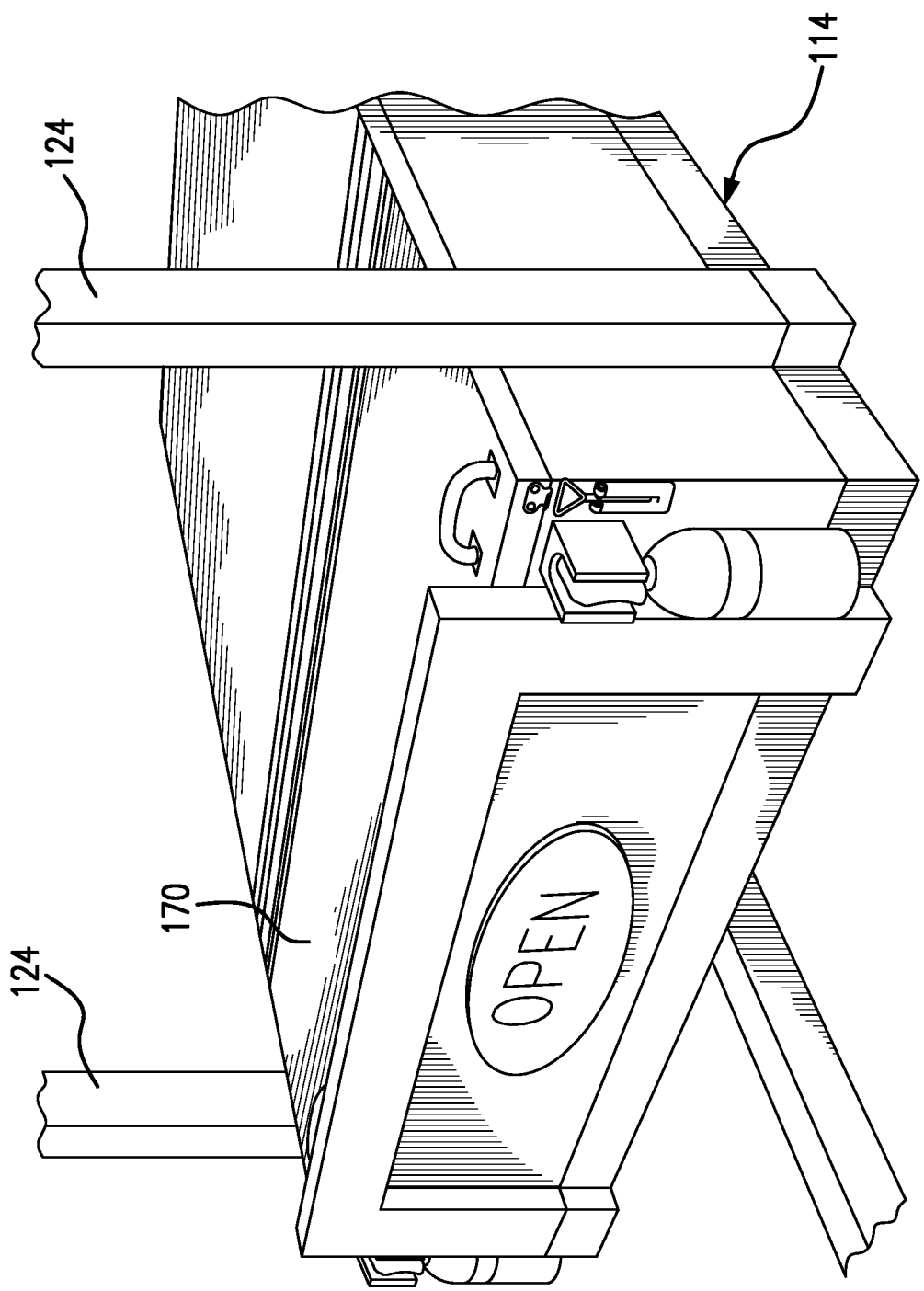
FIG. 12 is a perspective view of a forward end of the trailer including a cooler.
Figure 13:
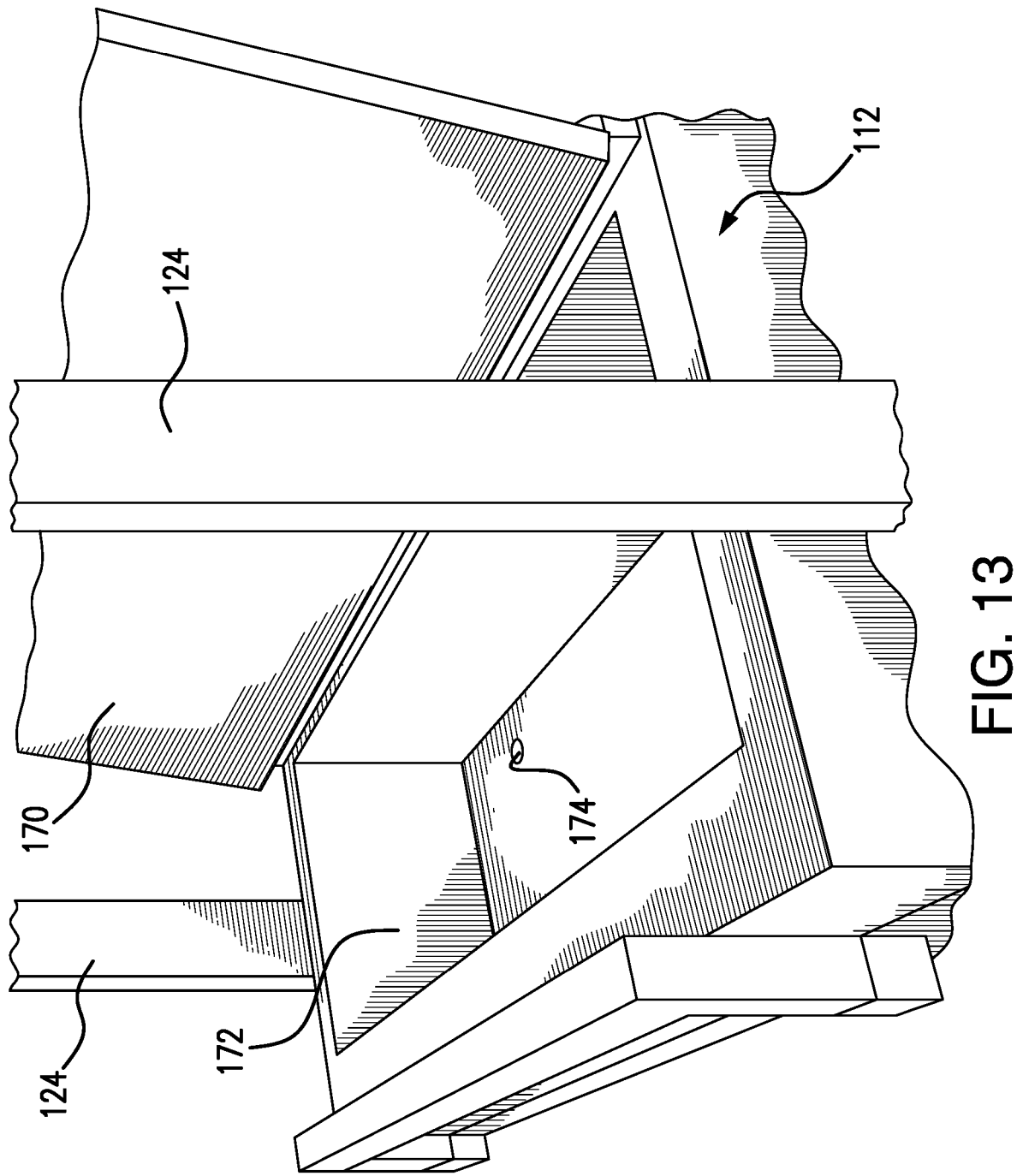
FIG. 13 is a perspective view of the forward end of the trailer shown with a cover of the cooler opened to reveal the cooler for receiving ice along with beverages or food items intended to be kept cold.

Referring to FIGS. 12 and 13, a forward end of the trailer 112 includes a cooler compartment that is covered by a lid 170. When the lid is opened, as seen in FIG. 13, the interior of the cooler 172 is revealed, along with a drain 174 in the bottom of the cooler. The cooler can be filled with ice along with beverages or other food items that are required to be kept cold. As the ice melts, the liquid can be drained from the drain 174.

Referring now to FIGS. 14-24, a further embodiment of the present invention is directed to a combined barbecue and cooler assembly, generally indicated as 210. The assembly 210 is specifically structured for ease of transport. More particularly, the assembly 210 includes a main transport structure 212 that is supported on wheels, including rear wheels 214 and front wheels 216 which, along with an extendable handle 218 allow for ease of transport of the entire assembly 210. The extendable handle 218 is similar to that found on a typical wheeled suitcase.

Figure 22:
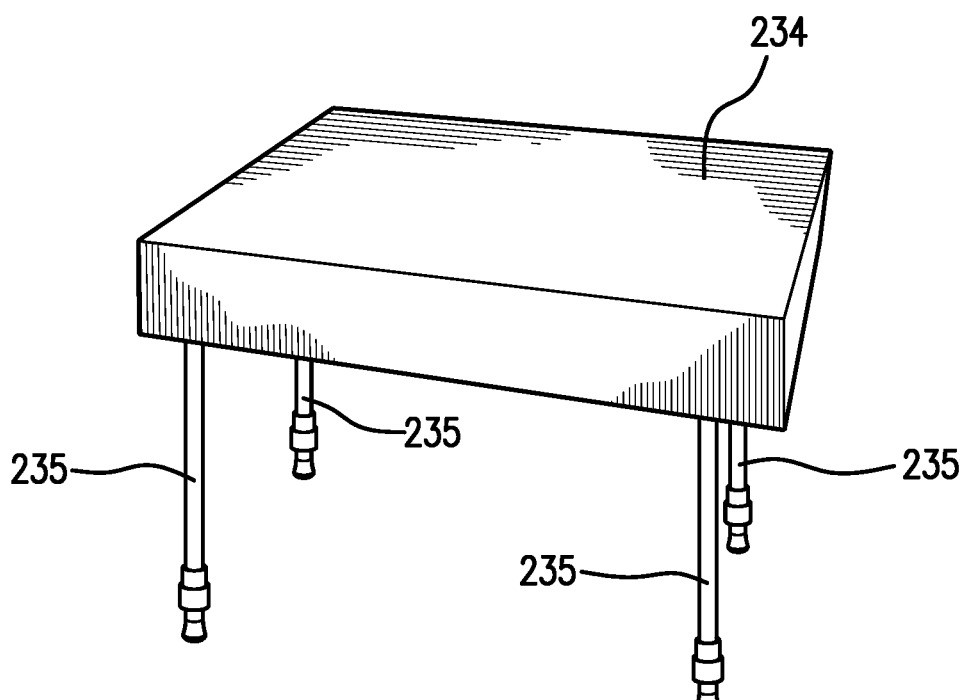
FIG. 22 is a top perspective view showing a protective cover of the entertainment panel removed and assembled as a table.

The main transport structure 212 further includes a cooler 220 that is insulated and structured for holding ice, as well as beverages and food items therein. The cooler 220 includes a top lid 222 that swings open to allow access to an interior cooler compartment 240 (see FIG. 16). In a preferred embodiment, the cooler 220 includes a rigid interior shell structure that is thermally insulated (i.e., foam filled). The rigid shell is received within a soft exterior case which may include the top lid 222. The top lid 222 is secured closed with a zipper 226. A storage compartment 224, such as a mesh bag with a zipper opening, is provided on the top of the lid 222 for holding items, such as legs 235 of a table assembly (see FIG. 22). A lower portion of the main transport structure 212 includes a battery storage compartment 228 which essentially forms a false bottom to the cooler. This lower compartment 228 also functions as a chassis for supporting the weight of the assembly 210 as well as the attachment of the wheels 214 and 216. A power outlet, such as an AC converter (i.e., similar to a cigarette lighter in an automobile) is provided on the side of the battery storage compartment (see 230). The side of the battery storage compartment 228 may further be provided with a charge indicator gauge 232 for indicating the amount of electric charge remaining on the battery storage source contained within the compartment 228. Front protective cover 234 removes from the front of the main transport structure 212 to reveal an entertainment panel 270. The protective cover 234 serves to protect the electronic components on the entertainment panel 270 and, when removed, functions as a table, as seen in FIG. 22. Specifically, the legs 235 can be removed from the pouch 224 on the top of the cooler and attached to the bottom side of the protective cover 234 to form the table, as seen in FIG. 22.

Figure 16:
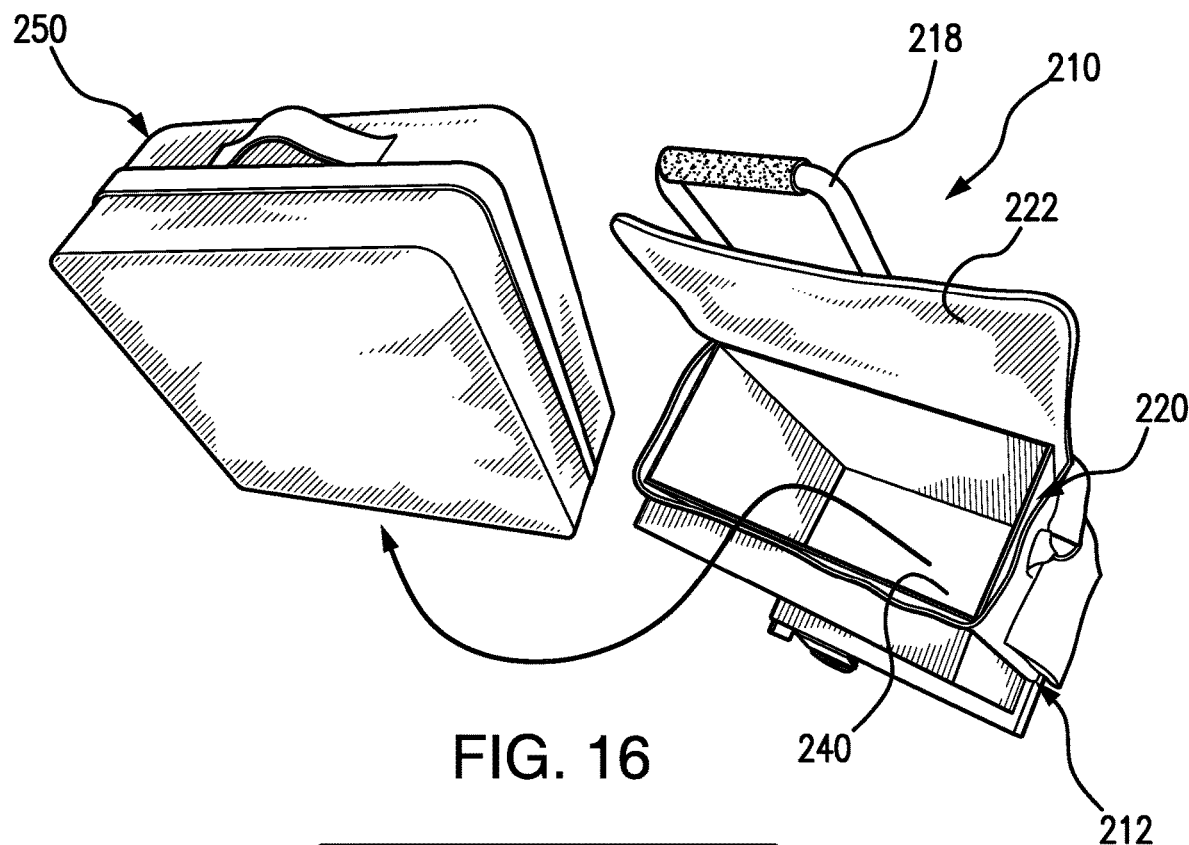
FIG. 16 is an exploded perspective view showing a grill/food warmer case being removed from a cooler compartment of the main transport structure.
Figure 17:
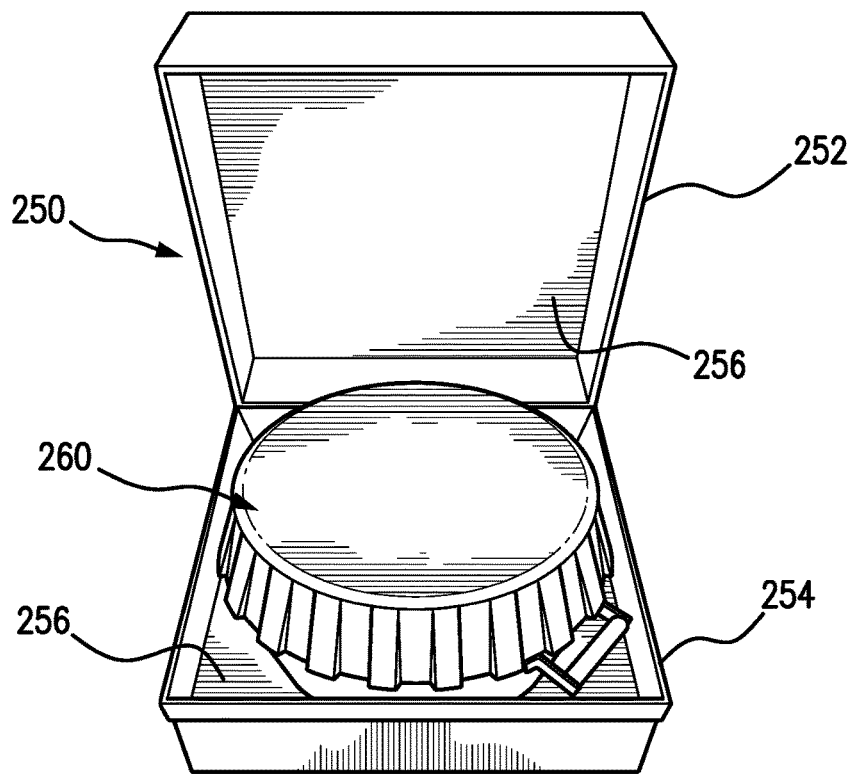
FIG. 17 is a front, top perspective view showing the grill/food warmer case open with a collapsed barbecue grill stowed therein.

Referring to FIGS. 16-17, a case 250 is sized and configured for removable receipt within the interior cooler compartment 240 for transport. The case 250 functions as both a barbecue grill storage and transport case, as well as a food warmer. Specifically, the case 250 is structured for holding a collapsed barbecue grill 260 therein. Once removed from the cooler compartment 240, the case 250 can be opened to reveal an interior compartment that is sized, structured and configured for holding a collapsed barbecue grill 260, as seen in FIG. 17. A top portion 252 and bottom portion 254 of the case 250 are both lined with an interior insulative foil lining that is removable if desired. The foil lining serves to insulate the top and bottom portions 252, 254 of the case 250 so that once the barbecue grill is removed, the case can function as a food warmer.

Figure 18:
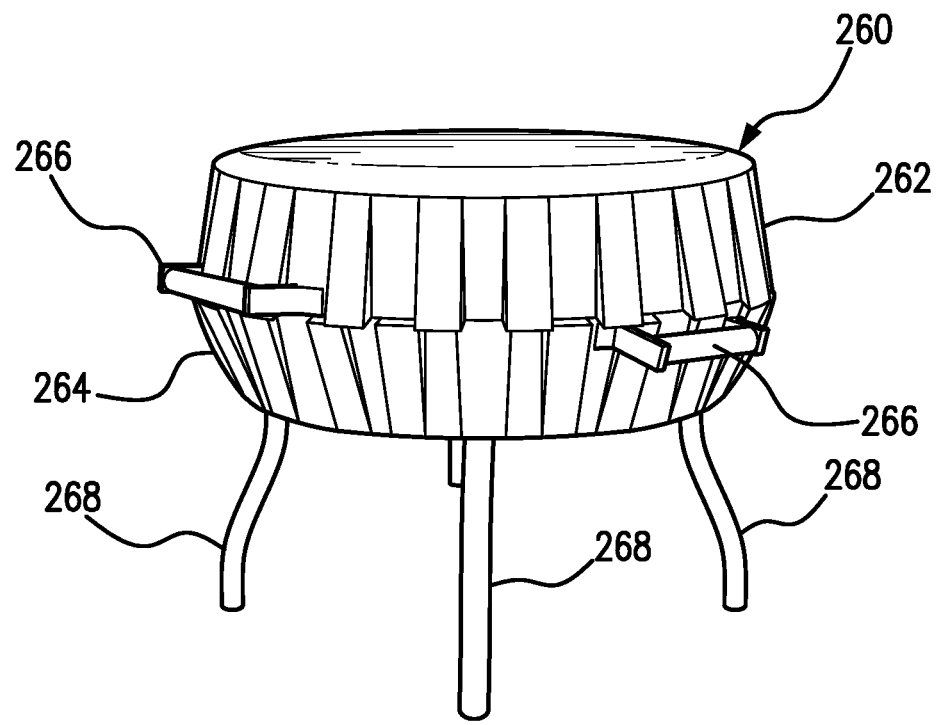
FIG. 18 is a perspective view showing the fully assembled barbecue grill once removed from the case.

The barbecue grill 260 is removed from the case 250 and assembled for use, as seen in FIG. 18. In a preferred embodiment, the barbecue grill 260 includes a top half 262 and a bottom half 264 that are each shaped to resemble bottle caps. The top 262 of the barbecue grill 260 is hinged to the bottom 264 so that the top 262 can be opened for grilling. The barbecue grill will naturally include a grill surface inside and may also be equipped with vents on the bottom and/or top, as well as means for connecting a portable propane tank, including a gas burner and regulator (not shown). The barbecue grill 260 further includes removable handles 266 and removable legs 268. When removed from the barbecue grill, the legs 268 can be stowed in a side pouch 227 on an exterior side of the main transport structure 212. The main transport structure 212 may further include a shoulder strap 229 for purposes of carrying the main transport structure 212 in situations where the assembly cannot be wheeled over a surface.

Figure 15:
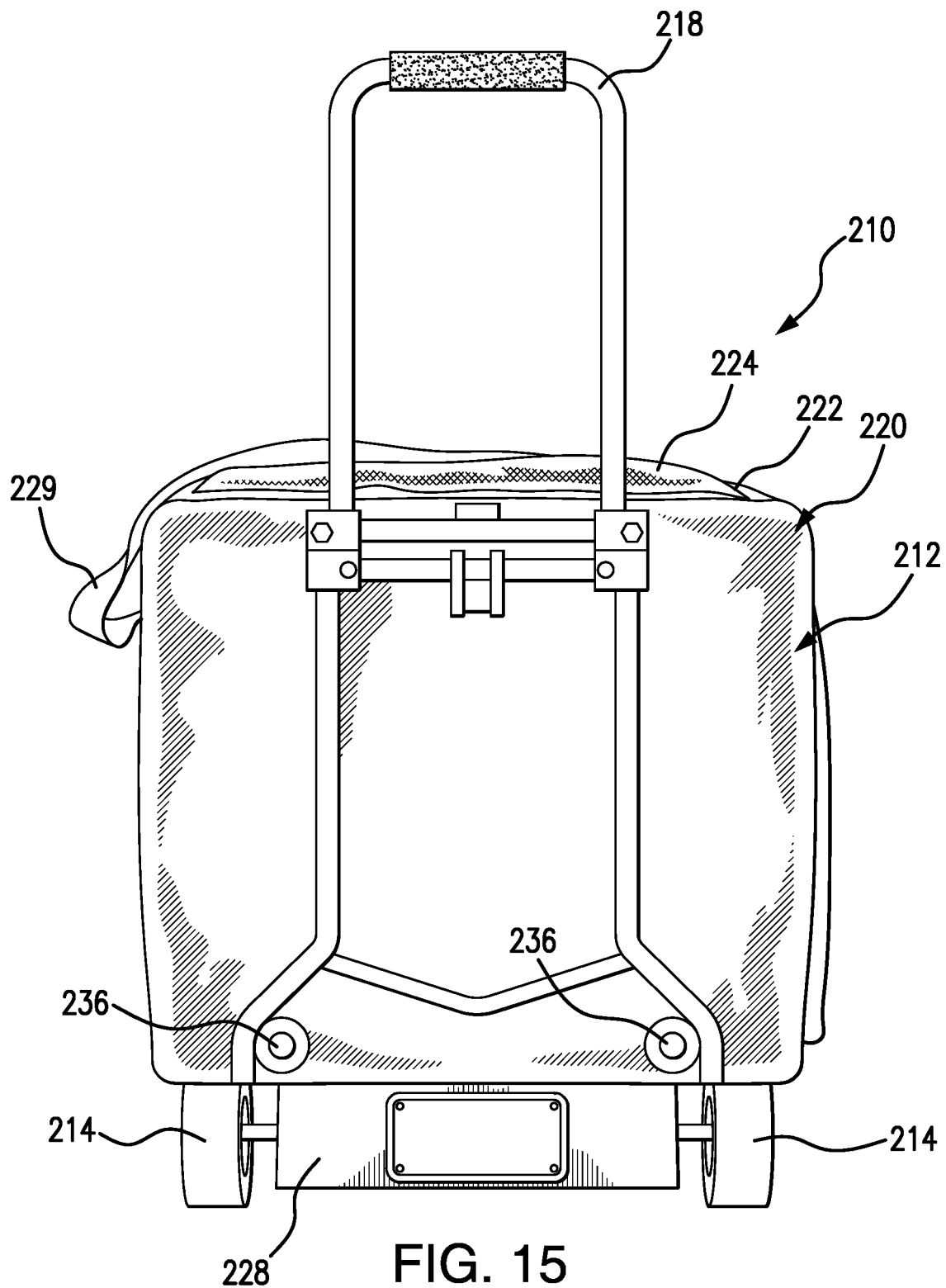
FIG. 15 is a rear elevational view of the cooler and barbecue grill assembly of FIG. 14.
Figure 19:
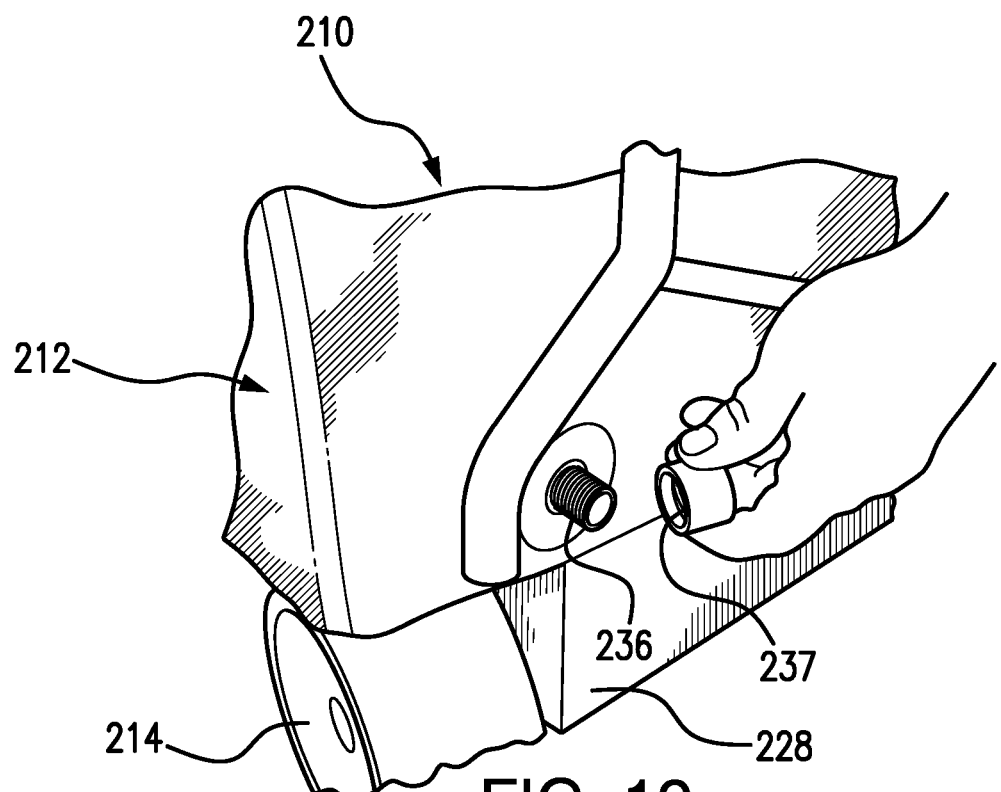
FIG. 19 is an isolated perspective view of a rear panel of the main transport structure showing a cap removed from a drain port of the cooler.

Referring to FIG. 19, a drain port 236 on the back panel of the main transport structure 212 communicates with the interior cooler compartment 240 to allow the cooler compartment 240 to be drained of liquid (i.e., melted ice). Specifically, a cap 237 screws onto the port 236 to close the port, and can be unscrewed and removed to allow drainage out through the port 236. As seen in FIG. 15, two drainage ports 236 may be provided for efficient draining of the cooler compartment 240.

Figure 20:
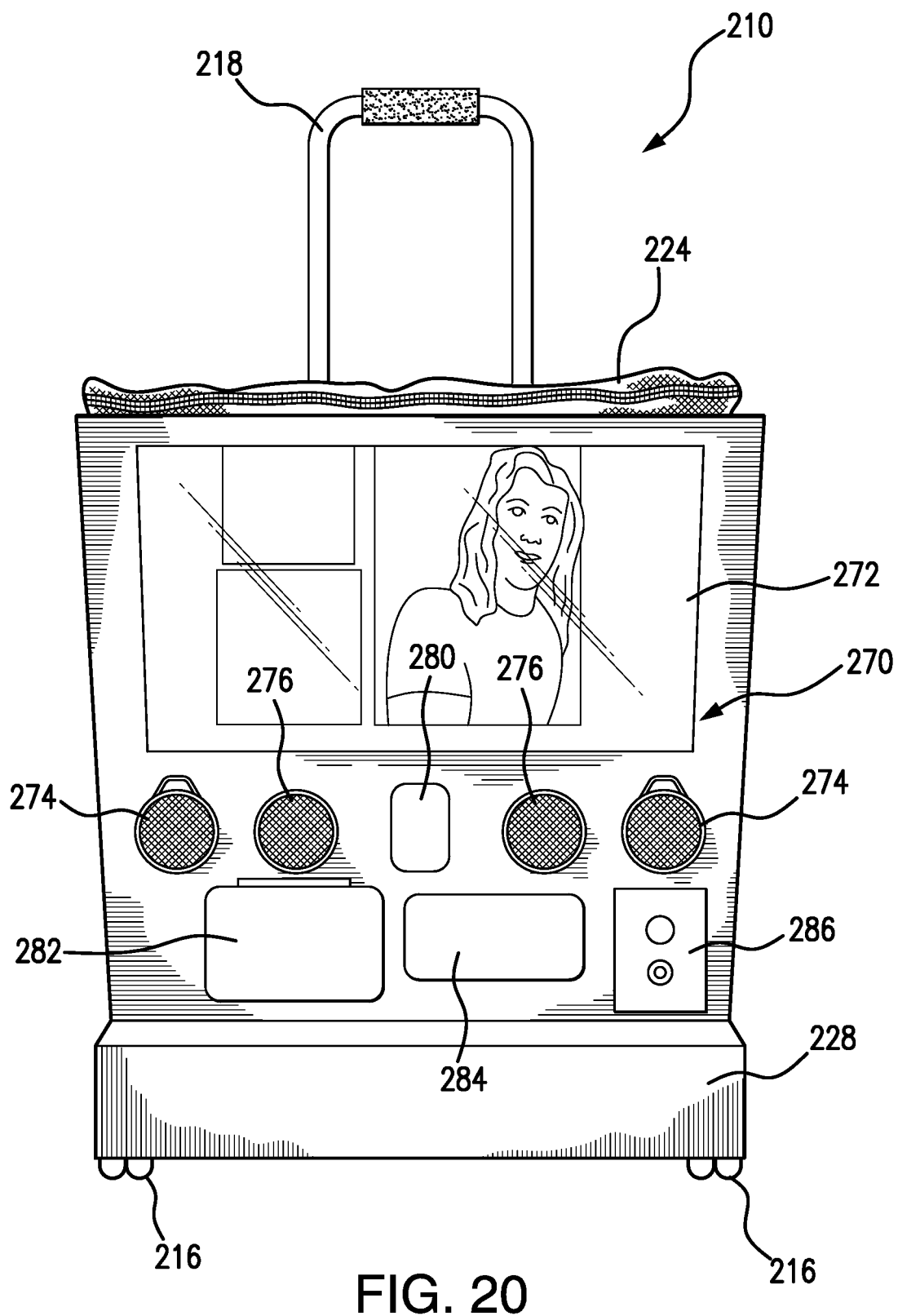
FIG. 20 is a front perspective view showing an entertainment panel on the front of the main transport structure.

Referring to FIG. 20, the entertainment panel 270 on the front of the main transport structure 212 includes a TV monitor 272, such as an LCD display. A wireless communication mirroring device 280 may be provided on the front panel 270 for wireless communication with a portable electronic device, such as a cell phone 273. This allows for video and photos viewed on the portable electronic device 273 to be simultaneously displayed on the TV monitor 272. The entertainment panel 270 further includes a plurality of speakers including removable speakers 274 and fixed speakers 276. Music from an external device, such as the portable electronic device 273, as well as other forms of audio can be played from the speakers. For examples, digital music stored on a portable electronic device 273 can be played with the sound emitted from the speakers 274 and 276. The speakers 274, 276 in combination with the portable electronic device 273 may also be used to provide a karaoke machine. The entertainment panel 270 may further include a storage compartment 282 that is essentially similar to a glove box for storing items such as a wallet, cell phone, and other small items. A removable, portable battery charging device 284 is also provided on the entertainment panel 270 and can be removed therefrom for providing a source of portable battery power and a quick charge or jumper charge for other electronic equipment and batteries. An outlet 286 on the entertainment panel 270 may provide various connection ports for electronic devices, as well as a battery recharge connection.

Figure 21:
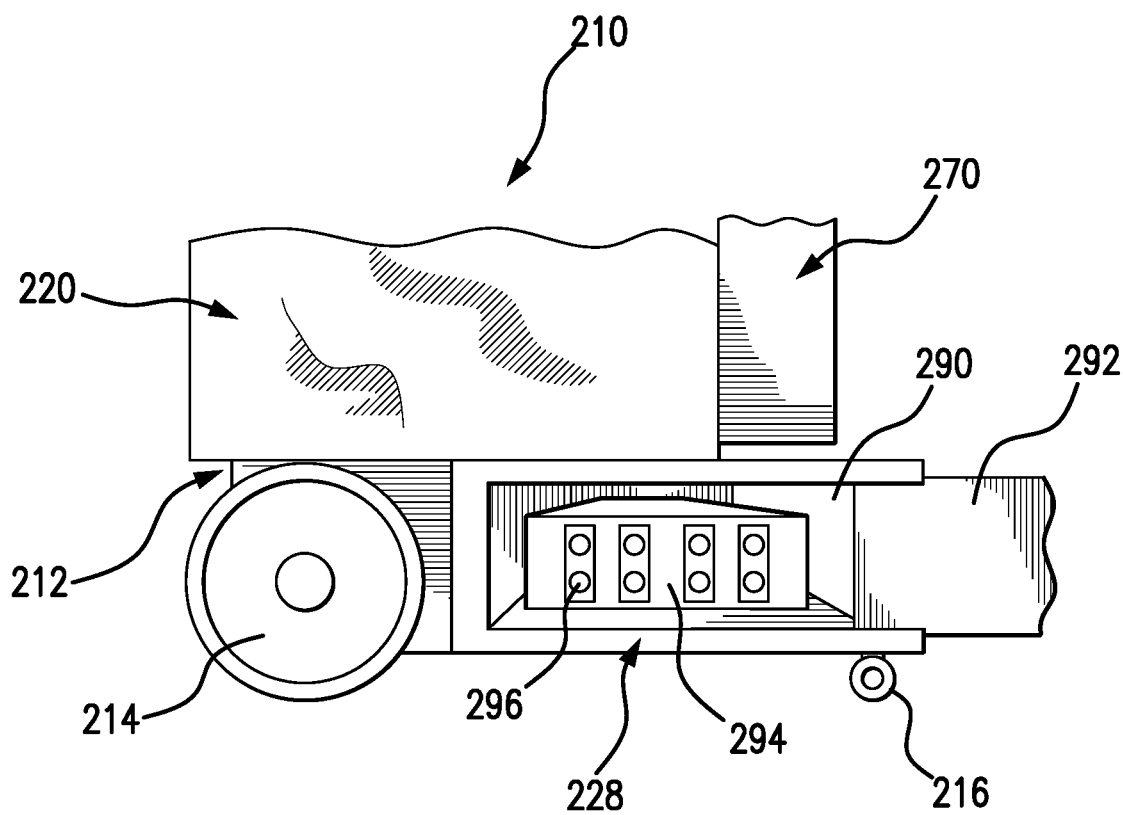
FIG. 21 is an isolated side perspective view showing a battery storage compartment in the base of the main transport structure with a door to the battery compartment open to reveal a rechargeable battery source and outlet connections for various electrical connections that plug into the rechargeable battery source.

Referring to FIG. 21, the battery storage compartment 228 includes an interior compartment 290 for storing one or more portable and rechargeable battery power sources 294. A door 292 normally covers and closes the compartment interior 290 and can be moved to an open position, as seen in FIG. 21 to reveal the portable battery source including a plurality of outlets for plugging in various electronic devices.

Figure 14:
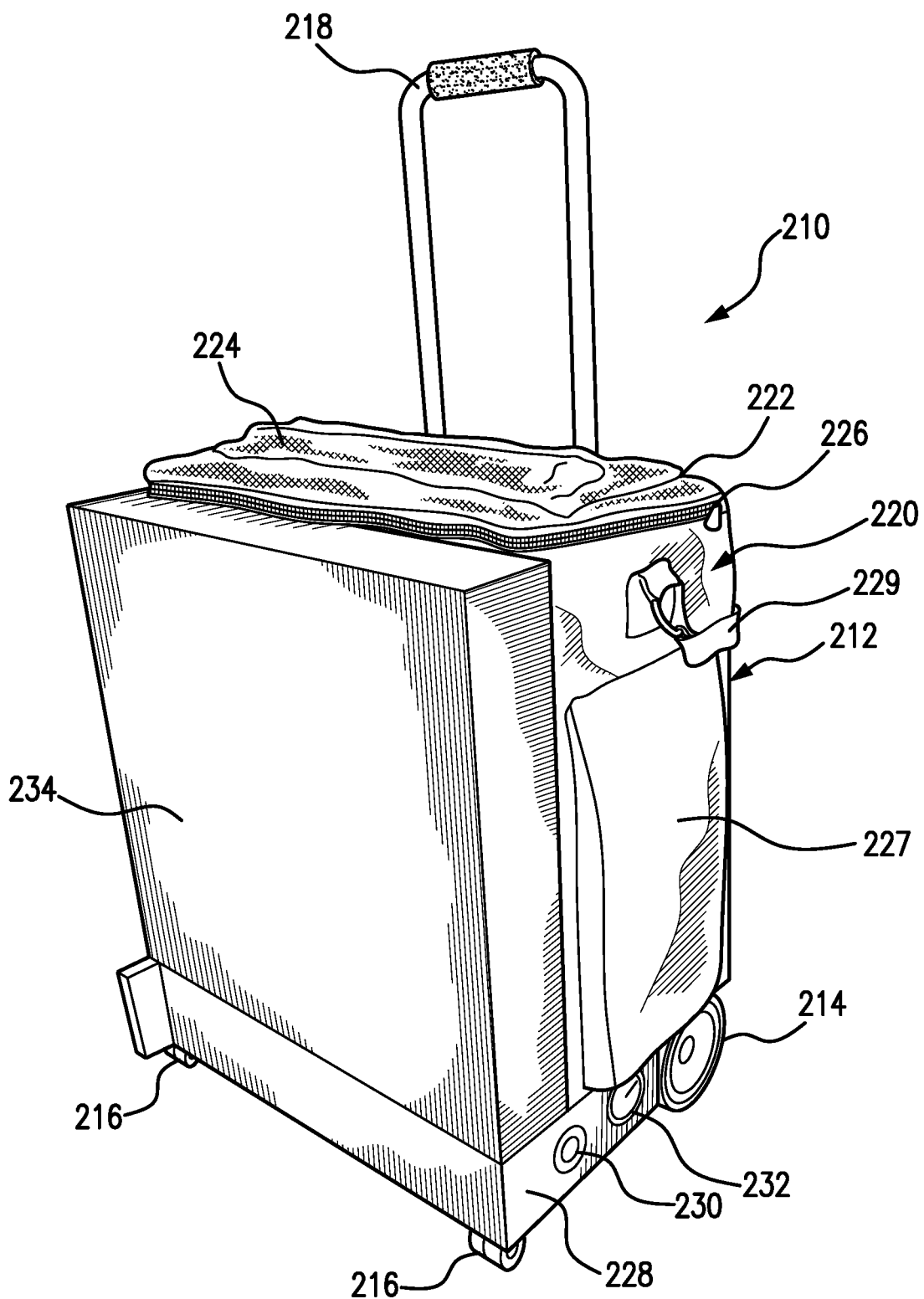
FIG. 14 is a front perspective view of the cooler and barbecue assembly of the present invention shown in a fully collapsed state and packaged for transport.
Figure 23:
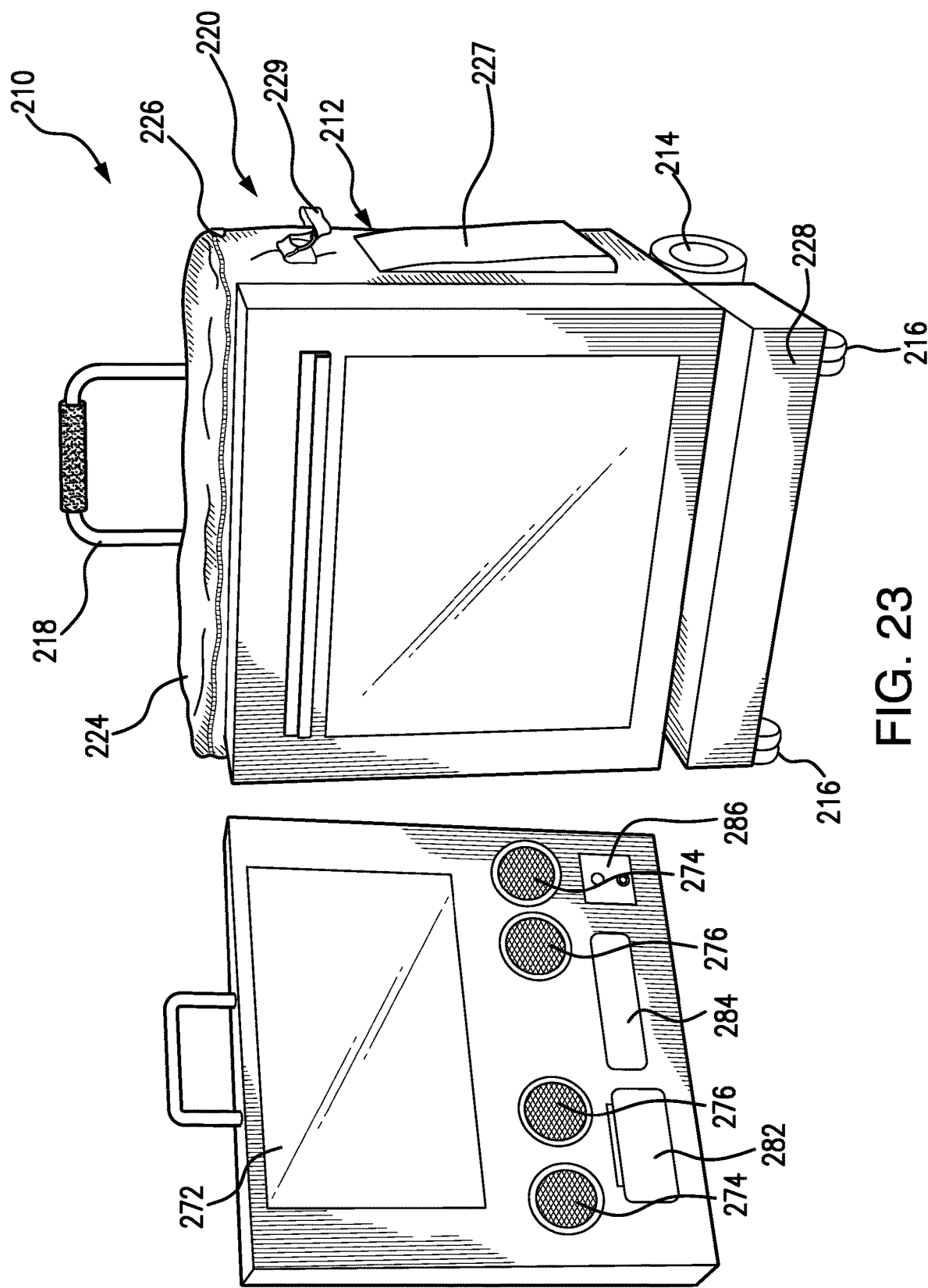
FIG. 23 is an exploded perspective view showing the mobile DC powered entertainment center of FIG. 14 shown with the TV and speaker panel removed from a remainder of the mobile DC powered entertainment center.
Figure 24:
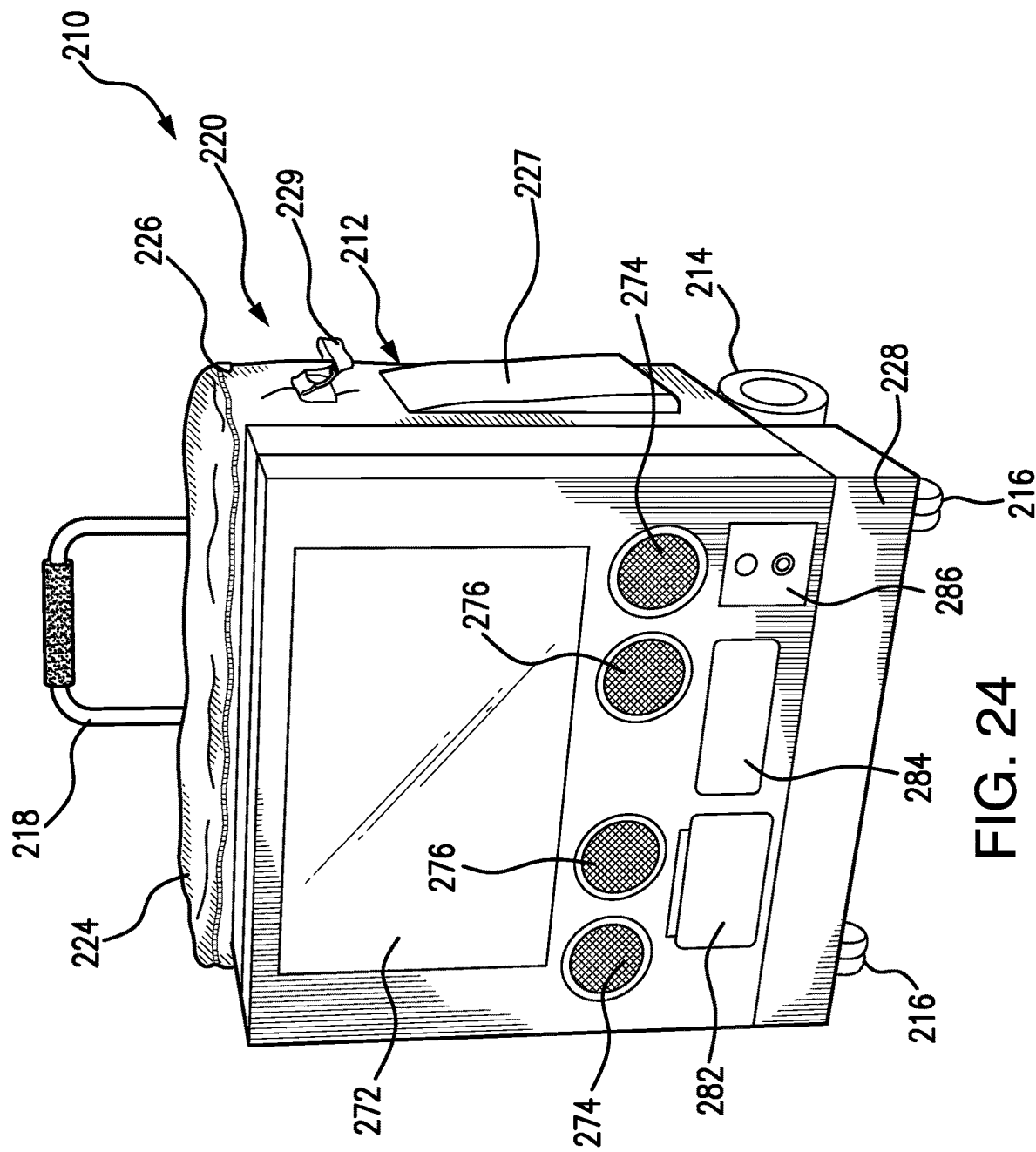
FIG. 24 is a front perspective view shown with the TV and speaker panel secured on the mobile DC powered entertainment center of FIG. 14 and with the protective cover removed to reveal the TV monitor and speakers.

Referring to FIGS. 23 and 24, the entertainment panel 270 on the front of the main transport structure 212 may be removably supported on a bracket or other removable support/attachment mechanism (including, for example, hook and loop fasteners) so that the entertainment panel 270 can be completely removed from a remainder of the assembly 210, as seen in FIG. 23. The front of the main transport structure 212 may further include a static electronic display screen for displaying an advertisement, messages, photographs and other information. This allows the TV monitor 272 with the speakers 274, 276 to be used independently of a remainder of the assembly 210. As previously noted, the TV monitor 272 and the speakers 274, 276 are powered by a rechargeable DC battery power source that can be recharged with the use of the outlet connection 286, as well as the portable battery charging device 284. It should be noted that the entertainment panel 270 may contain one or more rechargeable batteries for providing the desired DC power for powering the TV monitor 272 and the speakers 274, 276. When the assembly 210 is transported, the table as seen in FIG. 22 can be collapsed, with the legs 235 removed from the protective cover 234 and stored in the pouch 224 on the top of the assembly. The cover 234 can then be placed over the entertainment panel 270 to protectively cover the TV monitor 272, the speakers 274, 276, the storage compartment 282, the battery charging device 284 and the outlet 286 all of which are contained on the entertainment panel 270. FIG. 14 shows the assembly 210 with the protective cover 234 installed to cover the entertainment panel 270.

While the present invention has been shown and described in accordance with several preferred and practical embodiments, it is recognized that departures from the instant disclosure are fully contemplated within the spirit and scope of the present invention which is not to be limited except as defined in the following claims as interpreted under the Doctrine of Equivalents.

What is claimed is:

1. A mobile entertainment apparatus comprising:
 a main body including a front panel, a rear panel, opposite sides, a top and a bottom, and a plurality of wheels for transport of the main body on a ground surface;
 at least one flat screen television (TV) monitor removably supported on and visibly exposed on the front panel;
 a plurality of speakers connected to the flat screen television (TV) monitor and supported on the main body;
 a removable protective cover for protectively covering the at least one flat screen television (TV) monitor and the plurality of speakers, and wherein the protective cover is removable to reveal the at least one flat screen television (TV) monitor and the plurality of speakers;
 a plurality of support legs that are removably attachable to the protective cover when the protective cover is removed from the at least one flat screen television (TV) monitor and the plurality of speakers, wherein the plurality of support legs and the protective cover are assembled to form a table; and
 a rechargeable direct current (DC) power source for powering the at least one flat screen TV monitor and speakers.

2. The mobile entertainment apparatus as recited in claim 1 wherein the main body includes a built-in gaming platform including a video game console and at least one video game controller.

3. The mobile entertainment apparatus as recited in claim 2 wherein the at least one video game controller is a rechargeable wireless video game controller.

4. The mobile entertainment apparatus as recited in claim 1 further comprising a step up DC power converter.

5. The mobile entertainment apparatus as recited in claim 4 further including at least one rechargeable DC battery.

6. The mobile entertainment apparatus as recited in claim 5 further comprising a plurality of portable LCD monitors removably attachable to the main body.

7. The mobile entertainment apparatus as recited in claim 6 further comprising at least one solar panel on the main body for recharging the at least one rechargeable DC battery by solar energy.

8. The mobile entertainment apparatus as recited in claim 1 wherein the main body includes a cooler for storing items to be maintained at a cold temperature, and wherein the cooler may be at least partially filled with ice.

9. The mobile entertainment apparatus as recited in claim 1 further including a cooking grill carried on the main body.

10. The mobile entertainment apparatus as recited in claim 9 further comprising a food warmer compartment carried on the main body.

* * * * *